(No Model.)

T. S. BROWN & G. WILLIAMS.

HARROW.

No. 283,069. Patented Aug. 14, 1883.

Witnesses,
Geo. H. Strong.

Inventors,
T. S. Brown
and Geo. Williams
By Dewey & Co.
Attorneys

UNITED STATES PATENT OFFICE.

TIMOTHY S. BROWN AND GEORGE WILLIAMS, OF ROSEVILLE, CALIFORNIA.

HARROW.

SPECIFICATION forming part of Letters Patent No. 283,069, dated August 14, 1883.

Application filed March 3, 1883. (No model.)

*To all whom it may concern:*

Be it known that we, TIMOTHY S. BROWN and GEORGE WILLIAMS, of Roseville, county of Placer, State of California, have invented an Improved Harrow; and we hereby declare the following to be a full, clear, and exact description thereof.

Our invention relates to a new and useful harrow; and it consists in the construction of the tooth-holding bars, their shape, the means for securing the teeth and the braces, and other details of construction, all of which will hereinafter fully appear.

The object of our invention is to provide a simple and effective harrow.

Figure 1:
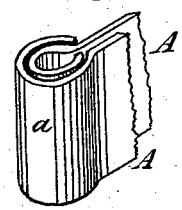
Figure 2:
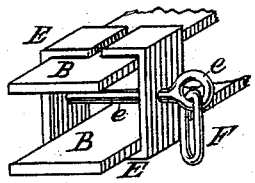
Figure 3:
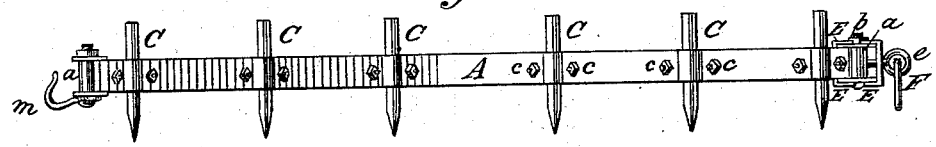
Figure 4:
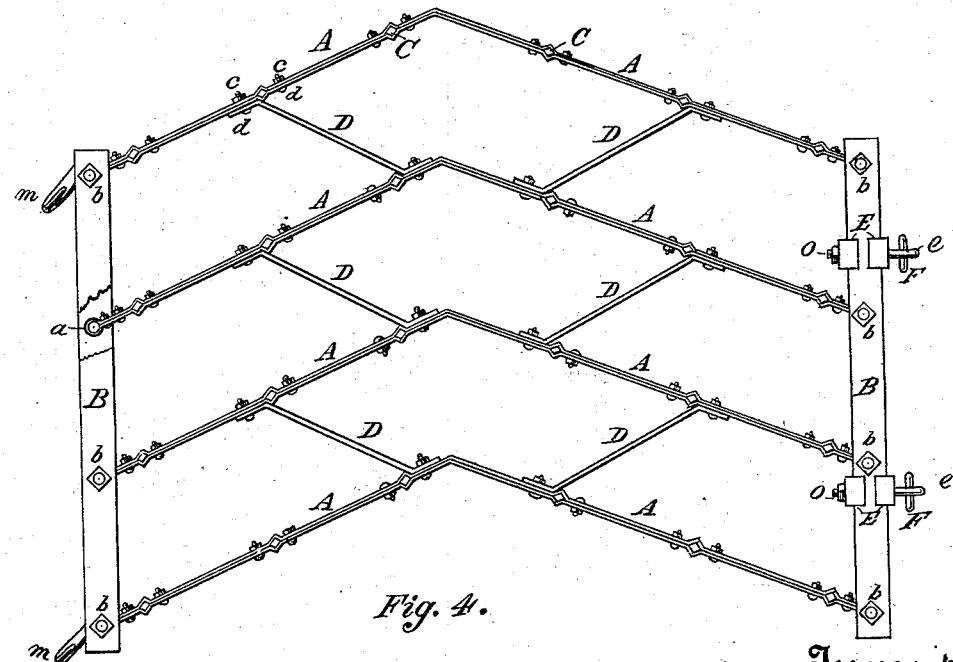

Referring to the accompanying drawings, Figure 1 is a detail perspective of the eyes *a*, formed at the ends of the tooth-holding bars A. Fig. 2 is a detail perspective of the clamps E for the draft-links. Fig. 3 is a side edge view of the harrow. Fig. 4 is a plan of said harrow.

A represents the tooth-holding bars. These consist each of two strips, their ends bent around each other, forming eyes *a* at each end, Fig. 1. Their ends rest between cross-strips B, and bolts *b* pass down through said cross-strips and through the eyes *a*. Thus the bars are secured. At intervals these bars are crimped or expanded to form sockets, through which the teeth C extend, and in which they are secured by a bolt, *d*, and nut *c* on each side. By loosening the nuts *c* the teeth may be removed or adjusted, as may be desired. The teeth may be clamped securely by tightening up the bolts.

D represents braces, consisting of strips bolted between the bars A, the angles of the bends at their ends being set flush in the corners formed by the tooth-crimps, thus forming a secure brace therefor. It will be observed that these bars are bent at points a little nearer one end than the other. This is for the purpose of covering effectively as much space as possible without materially widening the frame, and, further, to get a more direct draft.

Upon the cross-bar B are clamps E, consisting of two bent strips, embracing the edges of the bar. These have bolts *e* and nuts *o* for tightening up. To these clamps or bolts the draft-links F are secured. By loosening the bolts the clamps may be adjusted upon the bar to equalize the draft, or they may be transferred to the other end. At the ends of the under strips or cross-strips B are hooks *m* for coupling sections.

We intend to couple several sections of this description together, and, by reason of their side bend, make the entire device cover appreciably more ground than it would if it were straight. The sections, being light, may be thus increased and a very effective implement provided.

Having thus described our invention, what we claim as new, and desire to secure by Letters Patent, is—

In a harrow, the tooth-holding bars A, having eyes *a* formed in their ends, said bars lying parallel with each other and bent laterally, as shown, in combination with the end cross-bars, B, consisting each of two separated strips, between which the ends of the bars A rest, and the bolts *b*, passing through said bars and eyes *a*, substantially as herein described.

In witness whereof we hereunto set our hands.

TIMOTHY SQUIRE BROWN.
GEORGE WILLIAMS.

Witnesses:
W. J. BRANSTETTER,
A. C. THEILE.